Nov. 19, 1963   J. E. JONES   3,111,398
ELECTRONIC AND THERMODYNAMIC APPARATUS FOR PROCESSING GRAINS
Filed Sept. 23, 1960   2 Sheets-Sheet 2
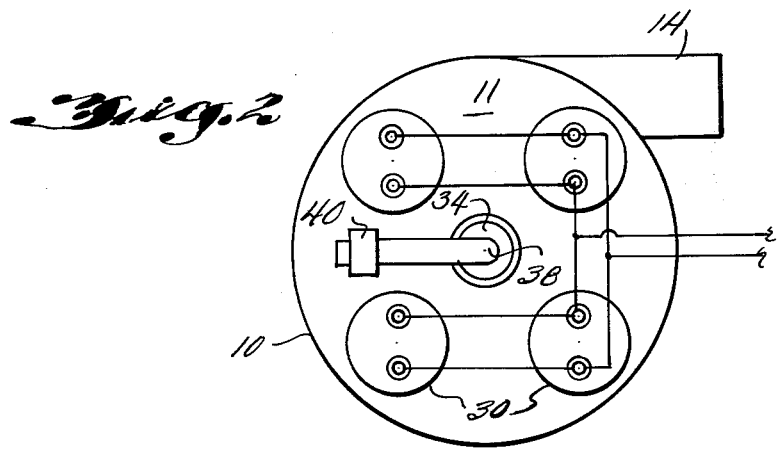
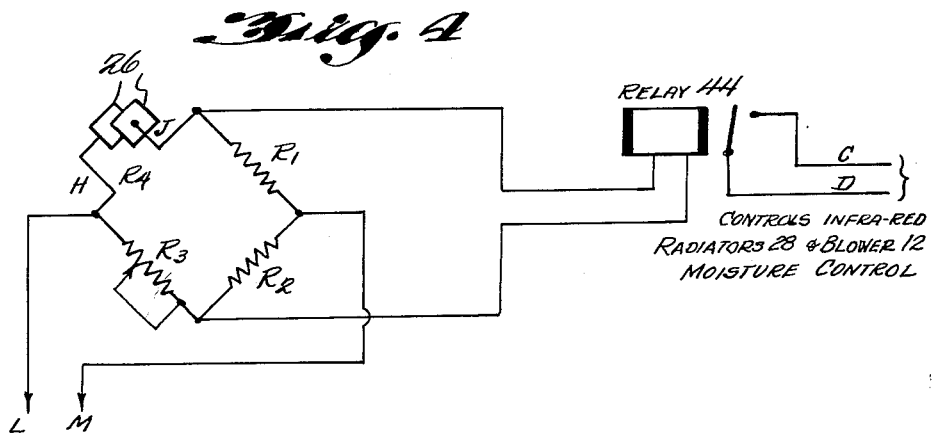
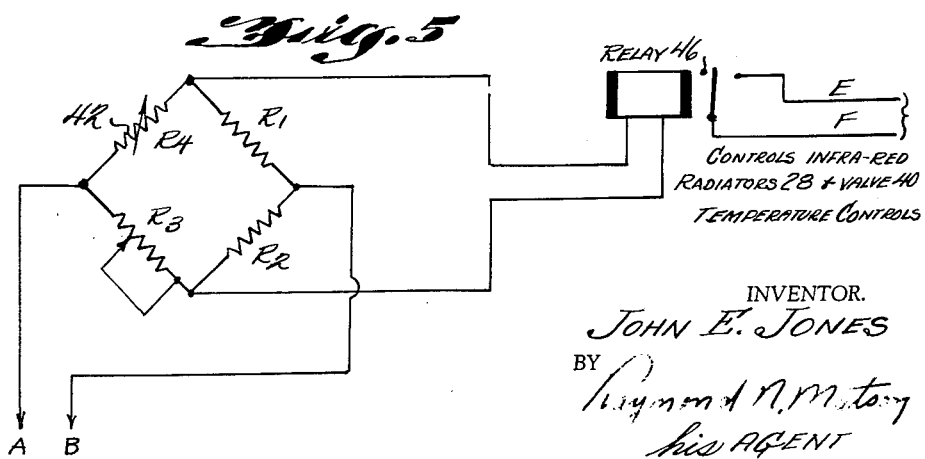
INVENTOR.
JOHN E. JONES
BY
his AGENT United States Patent Office 3,111,398
Patented Nov. 19, 1963

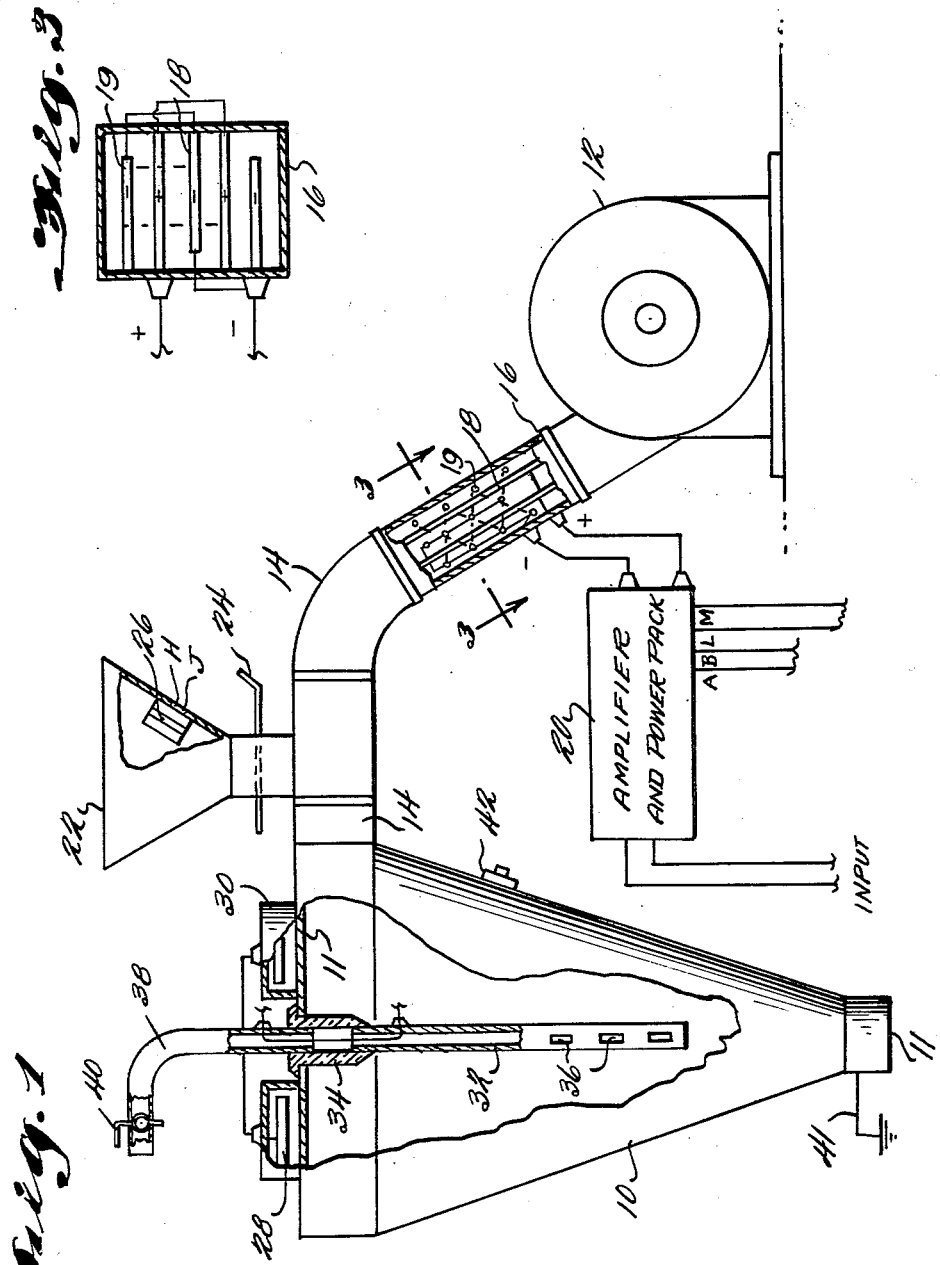

3,111,398
ELECTRONIC AND THERMODYNAMIC APPARATUS FOR PROCESSING GRAINS
John E. Jones, Enid, Okla., assignor to Oklahoma Electronics Industries, Inc., Waukomis, Okla., a corporation of Oklahoma
Filed Sept. 23, 1960, Ser. No. 58,047
5 Claims. (Cl. 34—1)

This invention relates generally to a method and apparatus for drying and processing grains, seeds, and other materials and more particularly to a method of and an electronic and thermodynamic apparatus for processing grains, seeds, and other materials by controlling and regulating their moisture content.

As is well known, the harvesting of grains such as wheat, etc. by apparatus such as combines, cannot be carried on when surface moisture is present or during conditions of high humidity. As a result, the harvesting procedure is often delayed two or three hours in the morning and it is customary to terminate cutting operations around 4:00 to 5:00 o'clock in the afternoon. The apparatus comprising the present invention expedites the harvesting of grains, etc. by permitting timely cutting without regard to moisture conditions and enables the harvesting operation to be conducted on an around-the-clock basis.

Various apparatus for drying grains, etc. are known in the art but these are usually characterized by a number of inherently disadvantageous features. Among these are: a bulkiness and a lack of mobility making them impractical for use in the field; a complexity of design and operation so as to be unsuitable for use with or on combines; a lack of moisture control and a subjecting of the grain to excessive temperatures or overdrying resulting in the destruction of the fertility and structure of the grain and the creation of an explosion hazard; and an unnecessarily high first cost as well as excessive maintenance costs.

Accordingly, the main object of the present invention is to provide an improved method of and an apparatus for processing grains, seeds and other materials by controlling and regulating their moisture content which will obviate the above and other disadvantages characterizing known methods and apparatus.

An important object of the present invention is to provide an improved method of and apparatus for treating grains, etc. wherein a proper grain treating environment is provided and maintained, an air current having particular characteristics is directed to the environment, and grain, etc. is fed to the air current for conveyance to the environment, the characteristics of which are automatically varied in accordance with the moisture content of the grain.

Another important object of the present invention is to provide an improved apparatus for treating grain wherein automatic controls are provided for measuring the moisture content of grain to be treated and for adjusting the drying effect in accordance with such measurments.

A further important object of the present invention is to provide an improved apparatus of the type described wherein a moving column of air is ionized to charge the grain, chaff, etc. which is fed thereinto for treatment so that upon arrival in the treating chamber which is of the cyclone type with heating and separating means, properly treated grain is readily separated from the chaff, dust, etc. and separately discharged.

A still further important object of the present invention is to provide an improved method of and apparatus for rapidly drying and processing seeds efficaciously, expeditiously, and economically without physical damage to their innate granular structure or germinative proclivities so as to be susceptible of successful, extended storage and free of parasitic infection inherent to the grain.

Another important object of the present invention is to provide an improved apparatus of the type described which has few moving parts, is free from electrical shock hazards, can regulate the moisture of the grain to a predetermined specific percentage, is produceable in compact form for ready attachment to a combine or other harvester to process the grain simultaneously with the harvesting, and can be a large permanent installation for grain elevators, terminals, etc. for grain processing.

Other objects and advantages of the present invention will become apparent during the course of the following description.

In the drawings I have shown one form of the invention. In this showing:

FIGURE 1 is a schematic view of the invention;

FIGURE 2 is a top plan view of the cylonator treating chamber;

FIGURE 3 is a cross-sectional view of the ionization chamber taken on the line 3—3 of FIGURE 1;

FIGURE 4 is a schematic wiring diagram showing the heat and blower controls responsive to the moisture conditions sensed in the hopper; and FIGURE 5 is a schematic wiring diagram showing the heat and blower controls responsive to the temperature conditions in the cyclonator treating chamber.

Referring to the drawings, numeral 10 designates a cyclonator or centrifugal separator having a top 11 to which air at an adequate velocity and pressure is delivered by a motor-driven blower 12 by means of a conduit 14 which is tangentially connected with the cyclonator 10.

An insulated ionization chamber 16 is mounted between the exhaust of the blower 12 and the conduit 14 and includes an ionization grid arrangement 18 comprising positively charged plate electrodes in close proximity to negatively charged rods or open-ended cylinders 19. The application of a high current transfer from an amplifier and power pack 20 through and across the grid net-work 18, 19 creates a corona effect that ionizes the air from the blower. The extra molecule of oxygen manufactured through this ionization process is derived from the inherent humidity in the air involved and/or from the moisture within the substance (grain, seed, etc.) so subjected.

Grain, seed, etc. to be treated is admitted to the conduit 14 by gravity by means of a hopper 22 having a flow control valve 24 and a pair of moisture sensing plates 26 which form a part of the moisture control means to be described.

The cyclonator or environment chamber 10 is in the form of an inverted cone and mounts four infra-red radiators 28 having covers 30 arranged symmetrically on its top 11 to increase the temperature within the cyclonator and of the grain. A high voltage electrode 32 adapted to carry positive charged current is mounted centrally within the cyclonator chamber by means of an insulator 34 mounted in the top 11. The electrode is tubular and provided with apertures 36 to facilitate the collection and/or dissipation of dust, chaff, and moisture through the electrode and out a discharge pipe 38 controlled by a valve 40 which is operated by a rotary type solenoid (not shown). Current to the electrode 32 (and to the ionization chamber 16) is supplied by the high voltage amplifier 20 at a high frequency producing an ionization effect. A suitable ground connection is provided at 41 and a temperature sensing device 42 is mounted in the wall of the cyclonator for a purpose to be described.

It will now be readily apparent that the blower 12 discharges air through the ionization chamber 16 and the conduit 14, past the hopper 22 where it picks up the grain to be treated and impels it with sufficient force into the cyclonator where centrifugal force propels it along and around the perimetric extremities of the wall in a helical orbit with a vortex at the center of the cyclonator adjacent the hollow electrode 32, thereby creating a negative pressure at this point. The opening of the discharge valve 40 is directly related to the temperature within the cyclonator 10 and controlled by the sensor 42 as will be explained.

The amount of heat, radiation and travel required to control or regulate the moisture within sundry grains, seeds, etc. varies considerably. The desired air velocity and pressure produced by the blower and the heat produced by the infra-red radiators are therefor controlled by relays responsive to the moisture and temperature sensors as illustrated in FIGURES 4 and 5.

As shown in FIGURE 4, the moisture sensing plates 26 are electrically connected as a part of a Wheatstone bridge for the purpose of measuring the moisture content of the grain which comprises resistors $R_1$, $R_2$, $R_3$ and $R_4$ or resistance sensing plates 26. Numeral 44 designates a bridge actuated relay to control the temperature of the infra-red radiators and the motor-driven blower 12 to increase or decrease the drying effect within the cylonator. Variable resistor $R_3$ is calibrated for moisture in percentage.

FIGURE 5 discloses a Wheatstone bridge circuit for temperature sensing and for recording the temperature in the cyclonator 10 and includes the resistors $R_1$, $R_2$, $R_3$ and $R_4$ or the thermistor temperature sensor 42 whose resistance decreases as the temperature increases. Variable resistor $R_3$ is calibrated in degrees of temperature. Numeral 46 designates a relay actuated by the bridge circuit to control the temperature of the infra-red radiators and the discharge valve 40. Input power in FIGURES 4 and 5 are indicated respectively as L and M and A and B as also indicated in FIGURE 1. Thus, exact regulation of the moisture content of the grain is automatically effected to a given standard.

*Operation*

The method and operation of the apparatus comprising the present invention are believed to be apparent. The blower 12 produces an adequate volume of air under sufficient pressure to effect the movement of the material being treated through the system's complete cycle. The action of the air upon the grains during the multi-rotational cycle within the cyclonator 10 assists in lowering the moisture and dust content of the grain without damage to its bran layer. The ionization within the cyclonator 10 produced by the electrode 32 reduces the humidity of the environment atmosphere and further reduces the connate moisture within the grain being processed.

The high frequency of the high voltage potential of the electrode 32 generates a drying effect upon the grain by the alternate exertion of expansion and compression forces. This high frequency also destroys the fertility of the parasites within the grain without endangering the fertility of the latter. This is due to the fact that while the infra-red frequency has deep penetrating properties tending to increase the temperature of the grains so subjected from the center outwardly, the time interval involved is such that the grains so treated do not remain under the radiation for a period sufficient to be detrimental or injurious to the grain's fertility.

As the grain carrying air enters the cyclonator, centrifugal force acting against gravity in spinning the mass in a helical orbit toward the grain discharge outlet 11, generates a vortex evincing a negative pressure coefficient. The elongated axis of this vortex corresponds with the elongated vertical symmetrical axis of the chamber in which the hollow electrode 32 is positioned. Inasmuch as the electrode carries a positive charge, the previously ionized particles of chaff, dust, and moisture are attracted to and through the hollow electrode to discharge upwardly and outwardly thereof as permitted by the differential pressures existing within the cyclonator 10 and the valve 40.

The apparatus described is readily arranged in compact form for installation on a combine for use in the field and may receive its electrical energy from any suitable source such as a motor generator set, etc.

The use of the word "cyclonator" to designate the environment chamber 10 is intended to define a chamber in which an air system of high pressure air rotating around a low pressure area may be effected.

It is to be understood that the form of the invention herewith shown and described is to be taken as a preferred example of the same and that various changes in the shape, size and arrangement of parts may be resorted to without departure from the spirit of the invention or the scope of the subjoined claims.

I claim:
1. An apparatus for controlling the moisture content of grain, seeds, etc. comprising in combination, a cyclonator having a bottom discharge opening for treated seeds and a centrally positioned upwardly and outwardly extending exhaust conduit for chaff, dust, and moisture, a motor-driven blower, an air conduit connected to said blower and tangentially with said cyclonator to produce a column of air moving in a downwardly helical orbit therewithin upon operation of said blower, means mounted on said air conduit for delivering grain to be treated thereto for movement with the column of air, air dehumidifying means comprising an ionization chamber to ionize and negatively charge the air passing therethrough mounted in and forming a part of said air conduit adjacent said blower, said exhaust conduit comprising a high voltage, perforate, positive electrode to produce an ionization effect in the vortex of the helical orbit of the moving column of air and attract negatively charged air and particles thereto, and heating means mounted on said cyclonator for further drying the air column and grain carried thereby during its passage through said cyclonator.

2. An apparatus as recited in claim 1 wherein said heating means includes high frequency infra-red radiators positioned to heat the entire interior of said cyclonator.

3. An apparatus as recited in claim 1 wherein moisture sensing means is mounted in said grain delivering means and is operative to control the volume of air delivered by said blower and the amount of heat delivered by said heating means.

4. An apparatus as recited in claim 1 wherein a flow control valve is mounted in said exhaust conduit, and temperature sensing means is mounted in said cyclonator and is operative to control the amount of heat delivered by said heating means and the operation of said valve.

5. An apparatus as recited in claim 3 wherein a flow control valve is mounted in said exhaust conduit, and temperature sensing means is mounted in said cyclonator and is operative to control the amount of heat delivered by said heating means and the operation of said valve.

References Cited in the file of this patent

UNITED STATES PATENTS

| | | |
|---|---|---|
| 1,558,663 | Bell | Oct. 27, 1925 |
| 1,637,166 | Ullin | July 26, 1927 |
| 1,686,719 | Wood | Oct. 9, 1928 |
| 1,997,125 | Soyez | Apr. 9, 1935 |
| 2,069,193 | Behr | Jan. 26, 1937 |
| 2,318,576 | Arnold | May 11, 1943 |
| 2,608,768 | Noel | Sept. 2, 1952 |
| 2,816,067 | Keidel | Dec. 10, 1957 |
| 2,830,945 | Keidel | Apr. 15, 1958 |
| 2,911,730 | Schaub | Nov. 10, 1959 |